US011443139B2

(12) United States Patent
Molapo et al.

(10) Patent No.: US 11,443,139 B2
(45) Date of Patent: Sep. 13, 2022

(54) CONTEXTUAL SAFETY ASSESSMENT, RECOMMENDATIONS, PROVISIONING AND MONITORING

(71) Applicant: International Business Machines Corporation, Armonk, NY (US)

(72) Inventors: Maletsabisa Molapo, Pretoria (ZA); Chane Simone Moodley, Benoni (ZA); Sibusisiwe Audrey Makhanya, Pretoria (ZA); Darlington Shingirirai Mapiye, Randburg (ZA)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 16/887,692

(22) Filed: May 29, 2020

(65) Prior Publication Data

US 2021/0374469 A1 Dec. 2, 2021

(51) Int. Cl.
*G06K 9/62* (2022.01)
*G06N 3/08* (2006.01)
*G06F 16/903* (2019.01)
*G06F 40/20* (2020.01)

(52) U.S. Cl.
CPC ......... *G06K 9/6256* (2013.01); *G06F 16/903* (2019.01); *G06F 40/20* (2020.01); *G06K 9/6277* (2013.01); *G06N 3/08* (2013.01)

(58) Field of Classification Search
CPC ..... G06F 16/903; G06F 40/20; G06K 9/6256; G06K 9/6277; G06N 3/0454; G06N 3/08; G06V 20/52
See application file for complete search history.

(56) References Cited

U.S. PATENT DOCUMENTS

2003/0093200 A1* 5/2003 Gutta ............... G08B 13/19652
701/45

FOREIGN PATENT DOCUMENTS

| CN | 105809884 A | 7/2016 |
|---|---|---|
| CN | 205788187 | 12/2016 |
| CN | 108694487 A | 10/2018 |
| JP | 2019121067 A | 7/2019 |

(Continued)

OTHER PUBLICATIONS

World Health Organization. Training Course on Child Growth Assessment. Geneva, WHO, 2008. pp. 1-58.

(Continued)

*Primary Examiner* — Manuchehr Rahmjoo
(74) *Attorney, Agent, or Firm* — Shimon Benjamin; Otterstedt & Kammer PLLC

(57) ABSTRACT

Method and systems for identifying dangers in an accessible environment. Computer vision and video analysis is performed on one or more images and/or video of the accessible environment to generate a series of still frames for a database of training images and natural language processing (NLP) is performed on one or more written reports to generate textual parameters. An online image similarity search is performed using the textual parameters to generate additional images for the database of training images and a risk/danger prediction model is generated based on the database of training images. One or more potential dangers are identified, and one or more warnings are generated using the risk/danger prediction model.

18 Claims, 8 Drawing Sheets

(56) References Cited

FOREIGN PATENT DOCUMENTS

| KR | 20070108645 A | 11/2007 |
|---|---|---|
| WO | WO2009138955 A2 | 11/2009 |

OTHER PUBLICATIONS

Nishida et al., Childhood-home-injury-situation simulation adaptable to an individual environment based on child physical model and injury semantic structure database, Procedia Manufacturing, 3, pp. 1872-1879, Jan. 1, 2015 https://www.sciencedirect.com/science/article/pii/S2351978915002309.

Qiu et al., Characteristics and predictors of home injury hazards among toddlers in Wenzhou, China: a community-based cross-sectional study, BMC public health, 14, 1, p. 638 (14 pages), Jun. 23, 2014 https://bmcpublichealth.biomedcentral.com/articles/10.1186/1471-2458-14-638.

Anonymous, Web page ROSPA—Accidents to Children, downloaded Dec. 1, 2019, 8 Pages, https://www.rospa.com/home-safety/advice/accidents-to-children/.

Tursz, et al. "Home accidents to children under 2 years of age." Paediatric and perinatal epidemiology 4.4 (1990): Abstract (1 page).

\* cited by examiner

BOTTOM VIEW

FRONT VIEW – GROUND LEVEL

FRONT VIEW – ABOVE GROUND LEVEL

CONTEXTUAL SAFETY ASSESSMENT, RECOMMENDATIONS, PROVISIONING AND MONITORING

BACKGROUND

The present invention relates to the electrical, electronic and computer arts, and more specifically, to a system and techniques for surveying and monitoring an environment, and recommending and providing environmental safety.

Accidents at home are some of the leading causes of injury among individuals worldwide. Many injuries happen quickly, and are often a result of everyday objects and home configurations. Many homes and other environments are "safety-proofed" to ensure a safe environment; but even in these environments accidents sometimes occur. These accidents may stem from new environments, new furniture, etc. Cameras can be installed for safety reasons, but these do not prevent accidents, although they are advantageous in retrospective investigation of the cause of an accident.

SUMMARY

Principles of the invention provide techniques for surveying and monitoring an environment, and recommending and providing environmental safety. In one aspect, an exemplary method includes the operations of performing computer vision and video analysis on one or more images and/or video of the accessible environment to generate a series of still frames for a database of training images; performing natural language processing (NLP) on one or more written reports to generate textual parameters; performing an online image similarity search using the textual parameters to generate additional images for the database of training images; generating a risk/danger prediction model based on the database of training images; and identifying one or more potential dangers and generating one or more warnings using the risk/danger prediction model.

In one aspect, a non-transitory computer readable medium comprises computer executable instructions which when executed by a computer cause the computer to perform the method of performing computer vision and video analysis on one or more images and/or video of the accessible environment to generate a series of still frames for a database of training images; performing natural language processing (NLP) on one or more written reports to generate textual parameters; performing an online image similarity search using the textual parameters to generate additional images for the database of training images; generating a risk/danger prediction model based on the database of training images; and identifying one or more potential dangers and generating one or more warnings using the risk/danger prediction model.

In one aspect, an apparatus comprises a memory, and at least one processor, coupled to said memory, and operative to perform operations comprising performing computer vision and video analysis on one or more images and/or video of the accessible environment to generate a series of still frames for a database of training images; performing natural language processing (NLP) on one or more written reports to generate textual parameters; performing an online image similarity search using the textual parameters to generate additional images for the database of training images; generating a risk/danger prediction model based on the database of training images; and identifying one or more potential dangers and generating one or more warnings using the risk/danger prediction model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

integration of static and video imagery with text mining of injury case reports for:
1) preventative assessment of safety, prior to occupation and dynamically when there are changes to the home or other environment;
2) image and video analysis of the home or other environment from different perspectives;
3) preventative assessment of safety in the context of physical conditions;
4) risk modelling based on demographics;
5) dynamic re-assessment based on changes in the environment, demographics, and the like;
6) inclusive safety monitoring, hazard assessment, and early warning notification; and
7) dynamic interior design and safety recommendations based on dynamic safety risk mapping.

These and other features and advantages of the present invention will become apparent from the following detailed description of illustrative embodiments thereof, which is to be read in connection with the accompanying drawings.

DETAILED DESCRIPTION

Figure 1:
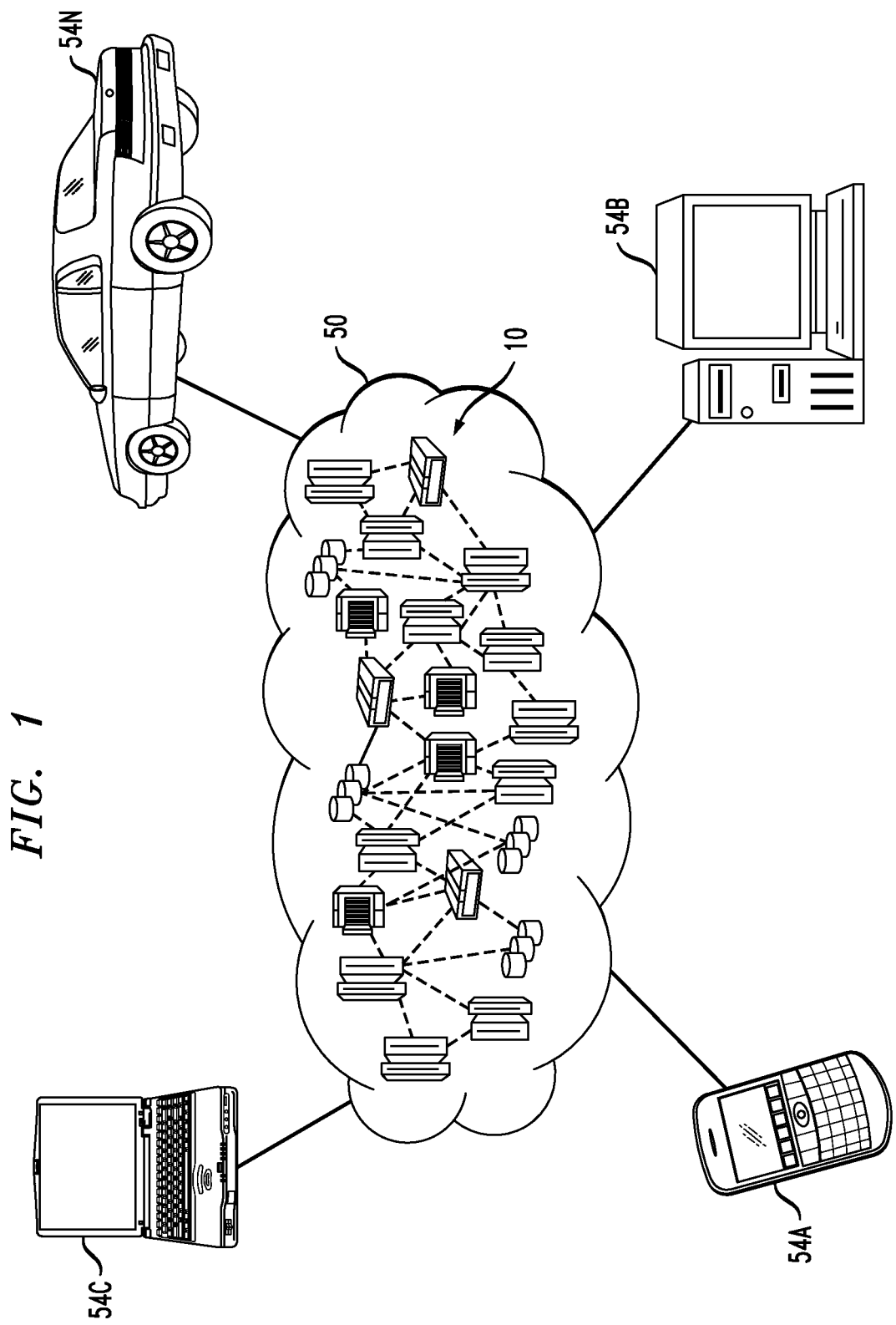
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
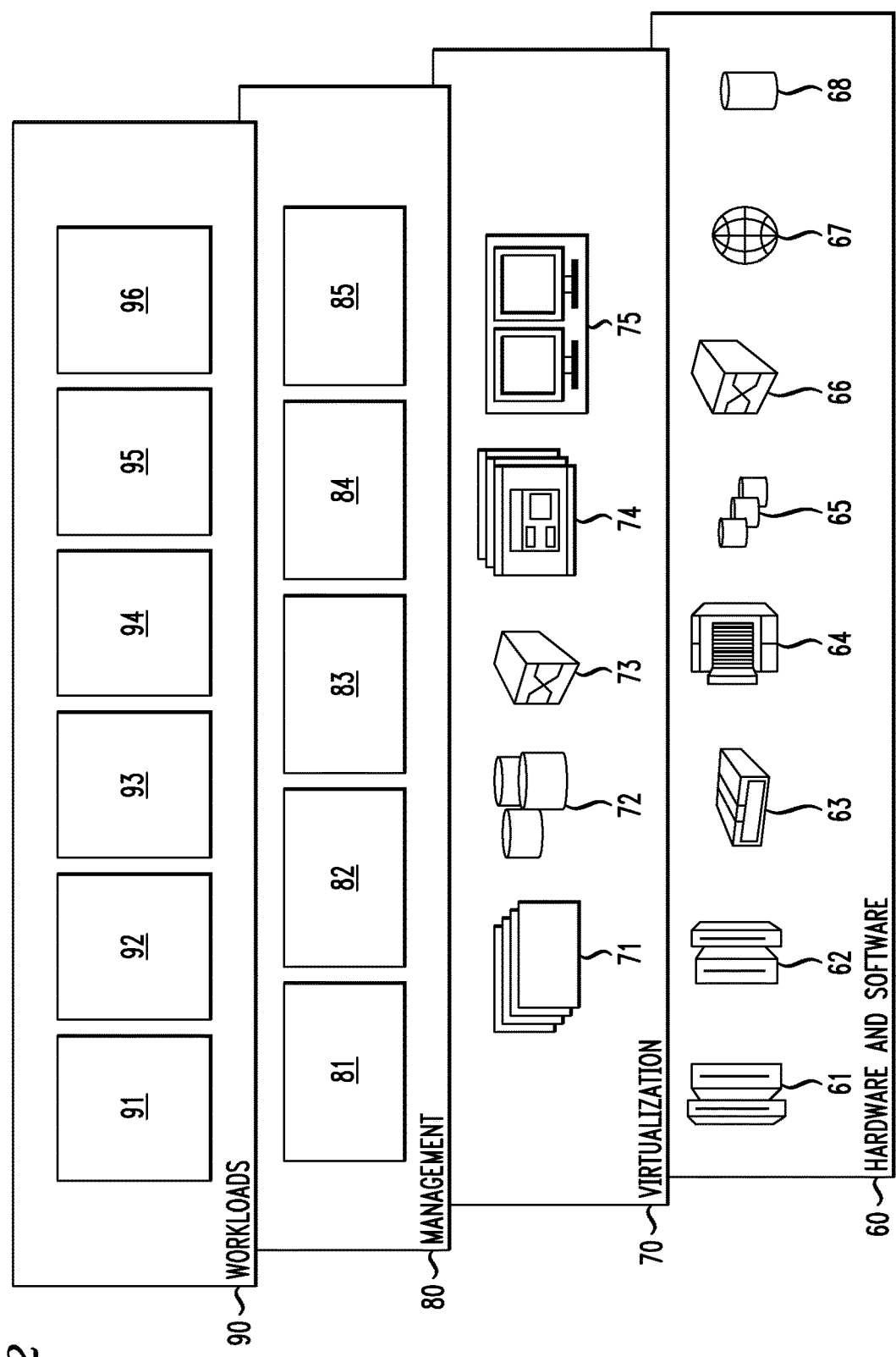
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and guidance system 96.

Generally, apparatus, systems, and methods are disclosed for surveying and monitoring an environment, and recommending and providing environmental safety. In one example embodiment, a system enables a user to assess the safety of the home or other environment for a specific individual. The assessment may be adapted over time as the individual matures. In one example embodiment, a method assesses the home by capturing visual information about the home environment. While described in the context of a home, the disclosed techniques may be used in any individual-accessible environment. In one example embodiment, the system predicts and quantifies the dangers in various locations in the home. In one example embodiment, the system recommends alternative/safer home configurations.

In one example embodiment, the system enables a user to input profile information about the individual, and then guides the user in capturing pictures and videos of the home. The output of the system is advice and recommendations regarding the potential dangers in the environment and recommendations for safety-proofing, for example, the home. The system also provides live monitoring based on the learned home environment. Among other aspects, the system offers the user five main features:

1) danger warning: based on the home environment, the system predicts which objects or home settings could be of danger;

2) safety recommendations: based on the identified/predicted dangers, the system identifies and presents recommendations for safety-proofing the environment, offering product recommendations and safety-proofing price estimates;

3) evolving warning and recommendations: the generation of new warnings and recommendations as the individual matures and the home environment changes; and 4) home risk profiling: the system provides a risk map based on what is chosen to safety-proof the house (such as new furnishings or safety-proofing devices) and different safety-proofing scenarios (where the risk score is dynamic in response to different combinations of risk scenarios).

Intelligent Safety Assessment

Variable Height Image Capturing

In one example embodiment, the user uses a smartphone or other device to capture a view of the home from the perspective of a child. If a user chooses to utilize a smartphone-based camera, the system makes a recommendation of how high to hold the camera, and uses a depth sensor (such as the depth sensor of a dual camera smartphone) to measure the height of the camera from ground level to ensure that the camera captures the home from the perspective of the individual. The user is also guided through taking pictures of the house as a whole, capturing an inventory of objects in the scene. The optimum height(s) from which to capture video and images are calculated based on the average height of an individual in different positions, such as during crawling, rolling, standing, and walking positions. In one example embodiment, the height at which to hold the device is computed by retrieving characteristics of the individual in the International Guide of Growth Indicators (which includes height-by-age). Based on the characteristics of the individual, the height is produced as output and then displayed to the mobile application. The same computed height is used as the value towards which to guide the user to keep the device at the appropriate height. The current height of the device from the ground is also calculated as described above.

Figure 3A:
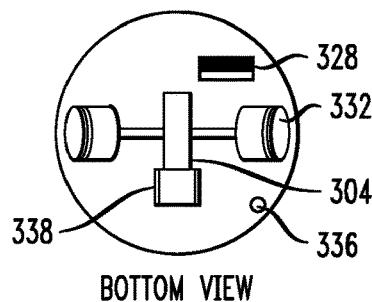
FIG. 3A is a first front view of a visual mobile device for surveying an environment, in accordance with an example embodiment.
Figure 3B:
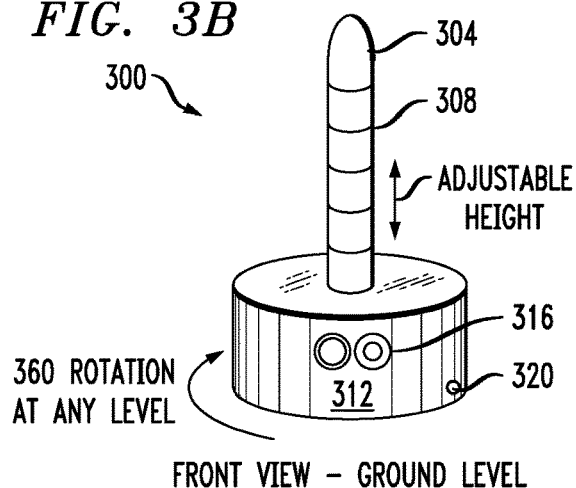
FIG. 3B is a second front view of a visual mobile device for surveying an environment, in accordance with an example embodiment.
Figure 3C:
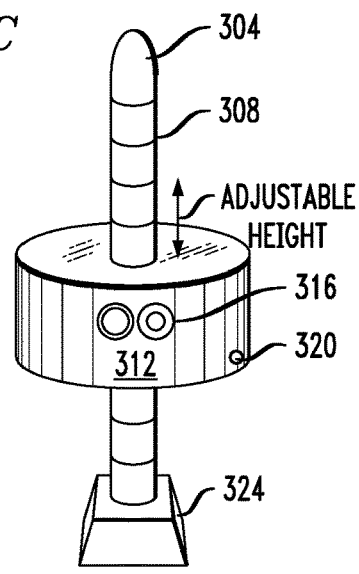
FIG. 3C is a bottom view of a visual mobile device for surveying an environment, in accordance with an example embodiment.

FIG. 3A is a first front view of a visual mobile device 300 for surveying an environment, in accordance with an example embodiment. FIG. 3B is a second front view of a visual mobile device 300 for surveying an environment, in accordance with an example embodiment. FIG. 3C is a bottom view of a visual mobile device 300 for surveying an environment, in accordance with an example embodiment. In one example embodiment, the visual mobile device 300 is implemented as a physical, camera-equipped adjustable mobile device that adjusts the camera height to capture video footage and/or still images at a height based on the individual. In one example embodiment, the visual mobile device 300 includes an image capture unit 312, a base 324, and a vertical axle 304. In one example embodiment, the vertical axle 304 is telescopic and has an embedded grating 308 that maintains the image capture unit 312 at a specified height. The base 324 includes swivel wheels 332 (including an associated drive motor) that provide for rotation (change of direction) and forward/reverse motion of the visual mobile device 300 (e.g., when the image capture unit 312 is in a lowest position, for example, see FIG. 3B, and the wheels 332 contact a floor or other surface). A charging port 328 and power button 336 allow the visual mobile device 300 to be charged and powered on/off (charge indicating light 320 flashes during charging and remains on when the battery is sufficiently charged for operation). The vertical axle 304 is attached to the base 324 and allows the image capture unit 312 to be raised or lowered relative to the base 324. According to one or more embodiments, the image capture unit 312 automatically adjusts to a specified height (e.g., retrieved from a height-by-age database or user input), for example, using an electronic height adjustment 338 (e.g., an electric drive motor with a wheel or sprocket in contact with the vertical axle that moves the image capture unit 312 up or down on the vertical axle 304, wherein a height of the image capture unit 312 is registered to a lowest position on the vertical axle 304) to raise or lower the image capture unit 312 position on the vertical axle 304. In one example embodiment, the image capture unit 312 is configured to rotate and tilt on the vertical axle 304.

The image capture unit 312 includes one or more cameras 316 for capturing images of the environment surrounding the visual mobile device 300. The use of dual co-located cameras 316 enables stereo vision and depth perception. In one example embodiment, the system computes the ground, crawling, and standing heights, as described above, and the heights are provided as input to guide the height (from ground level) of the image capture unit 312, wherein images are captured from different computed heights.

In one example embodiment, apart from video footage of the indoor environment, the visual mobile device 300 also records light and sound. With light and sound, the visual mobile device 300 is able to detect anomalies, such as flickering lights and loud sounds, which could trigger an adverse response in certain individuals.

In monitoring mode, the visual mobile device 300 crawls on the floor across various rooms, observing hazards. Capturing images from the level of a child, for example, makes it possible to identify, for example, an object on the floor or within reach of a child that may pose, for example, a choking risk.

Training Using Multimodal Data

Figure 4:
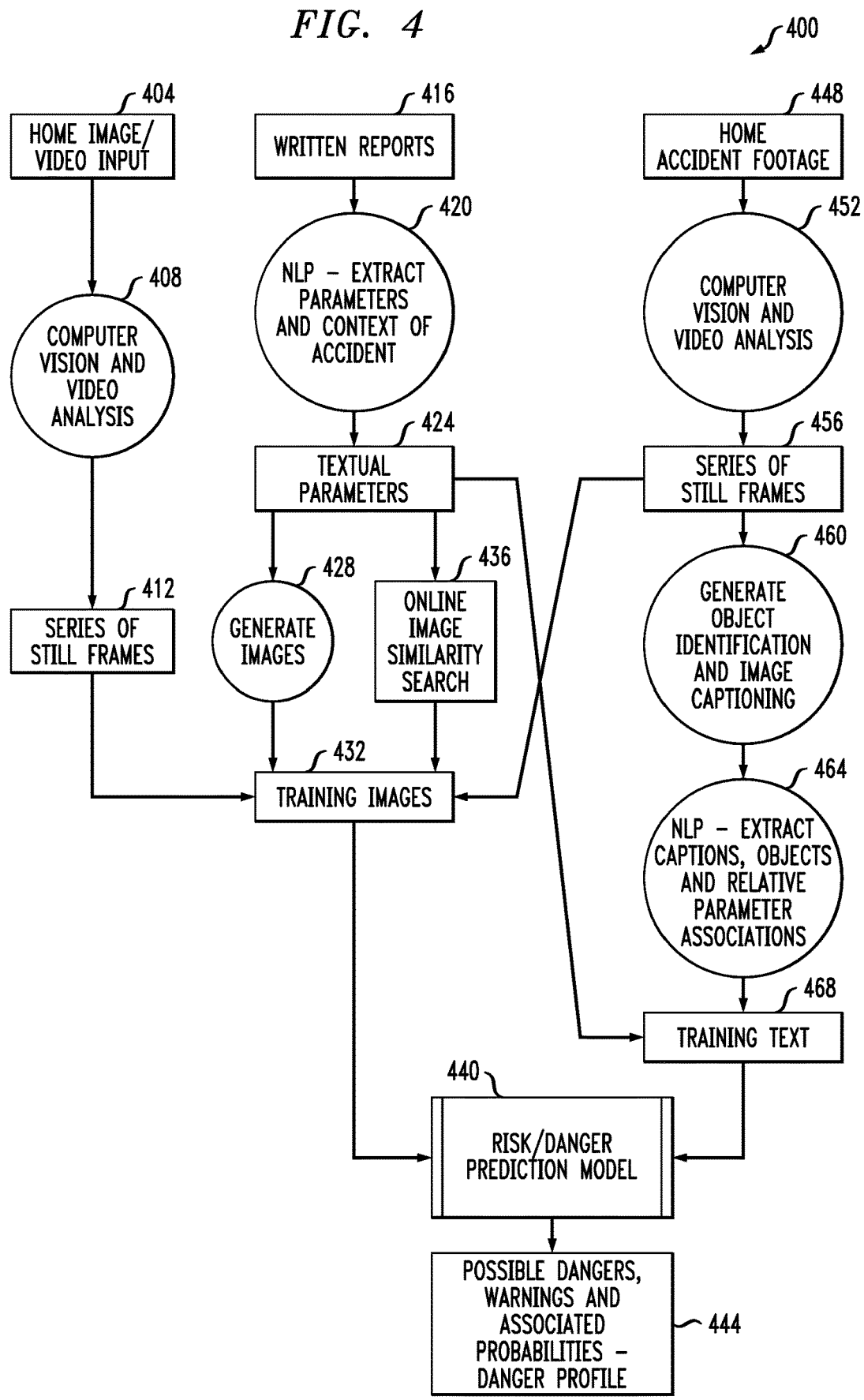
FIG. 4 is a workflow for training a model using multi-modal data, in accordance with an example embodiment.

FIG. 4 is a workflow 400 for training a model using multi-modal data, in accordance with an example embodiment. In one example embodiment, data for training the models that power the system 300 are extracted from written reports 416, video of home accidents 448 (such as example videos of accidents occurring in a home), and the like. Current reports, such as written reports 416, point out details, such as where (in which rooms) most accidents occur, what time of day most accidents occur, and what accidents are most common for each group of individuals.

From the written reports 416, the model reconstructs images based on the written text using a similarity search of online images, and using generative machine learning approaches (such as generative adversarial networks (GANs) and auto-encoders) to generate implied images from the textual descriptions of the incident. The more detailed the report, the more appropriate and more numerous are the generated frames, creating elaborate "generated footage" of the incidents. The generated frames are then used, alongside the frames from the video captured at various home accident scenes (home accident video 448), to train a risk/danger prediction model 440. From the generated and/or captured frames in the dataset, the risk/danger prediction model 440 learns accident patterns based on various parameters, which enables an individual risk assessment model (described more fully below in conjunction with FIG. 5) to predict danger and risk, such as:

room type—in the written reports 416, injuries from stemming from accidents in different rooms or areas are categorized differently, for example, injuries occurring on a staircase, in a living room, and the like can be grouped into separate categories;

house type—data on home accidents (such as the time of day, season, and the like) often show a pattern for when accidents are most likely to happen; the risk/danger prediction model 440 learns these patterns when predicting danger;

events or changes in context in the home (such as school holidays, moving, parties, and the like);

number of people in the home; and the individual-specific risk model (determined as described below).

In one example embodiment, the captured image(s) and/or video of the home environment (home image/video input 404) are provided as input to the system 300. Computer vision and video analysis are performed on the home image/video input 404 (operation 408) to generate a series of still frames 412 and to enable a model to learn from the sequence of events that led to the accident. The series of still frames 412 are then added to a database of training images 432.

Training images 432 are also acquired from written reports 416, video of accidents in the home (home accident video 448), and the like. In one example embodiment, natural language processing (NLP) is performed on the written reports 416 to generate textual parameters 424 (operation 420). The natural language processing extracts parameters, the context of the accident, and the like.

An online image similarity search is performed using the textual parameters 424 to generate additional images for the database of training images 432 (operation 436). In addition, GANs and autoencoders for image generation are used to generate additional images for the database of training images 432 (operation 428). The training images 432 are used as input to generate the risk/danger prediction model 440, as described more fully below.

In one example embodiment, computer vision and video analysis are performed on the home accident video 448 to generate a series of still frames 456 (operation 452). The series of still frames 456 are added to the database of training images 432. In addition, natural language processing and computer vision analysis are performed on the series of still frames 456 to identify objects within the images and to generate captions for the images (operation 460). For example, captions are generated on images that are originally captured at accident scenes, and frames extracted from the originally captured accident footage (video). Natural language processing is also performed to extract the captions, objects, and relative parameter associations (the relationships between objects/actions and the events that follow, for example, "pulling a kettle cord" is associated with a "boiling water burn") to generate training text 468 (operation 464).

In one example embodiment, the training images 432 and training text 468 are used to generate the risk/danger prediction model 440. The risk/danger prediction model 440 is then used to identify possible dangers and generate warnings 444 (along with associated probabilities of injury). A danger profile for the home may also be generated.

The Individual-Specific Risk Model

Reports on home accidents demonstrate that different individuals are at different risk of home accidents. For example, a crawling child who is learning to pick up small items is at a different risk (more likely to choke on small objects) than a child capable of walking and learning to reach for things and explore their environment (they are, for example, more likely to pull down hot items, such as kettles and pots, from stoves). Based on, for example, data from reported home injuries, the system presents the user with updated injury risks and recommendations for safety-proofing. Thus, the safety assessment is based on the individual.

The disclosed method models the risk of the individual based on, for example, home accident data and provides this as input into the safety assessment system. The risk model predicts the risk for an individual in regard to each risk item on a list of possible risks, with the probability of an accident being between 0 and 1 for all identified risks, such as suffocating, falling, suffering scalds and burns, choking, tripping, being injured by broken glass, rolling down stairs, drowning, and the like.

Figure 5:
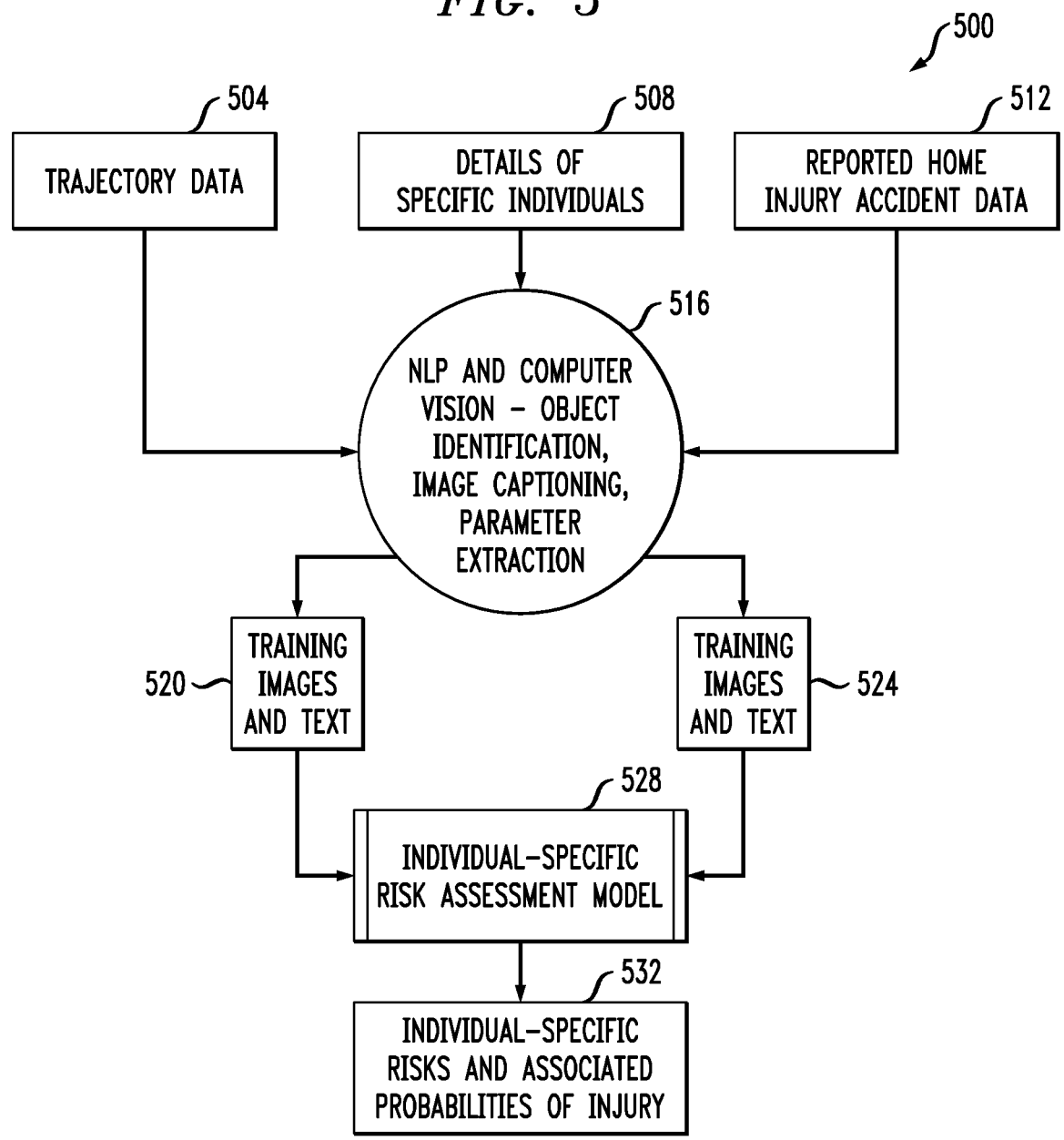
FIG. 5 is a workflow for training an individual-specific risk model, in accordance with an example embodiment.

FIG. 5 is a workflow 500 for training an individual-specific risk assessment model 528, in accordance with an example embodiment. In one example embodiment, natural language processing and computer vision analysis are performed on trajectory data 504, details of specific individuals 508, and reported home injury accident data 512 to identify objects, image captioning, and extracted parameters (such as the present season, the setup of the home, the number of people living in the home, and the like). The identified objects, captioned images, and extracted parameters from operation 516 are also used to generate training images and text 520 (raw images and original text from the reported home injury accident data 512 and footage of accidents) and training images and text 524 (images generated from text and captions generated from images from accident footage) (operation 516), as described in workflow 400. The training images and text 520, 524 are used to generate the individual-specific risk assessment model 528. The individual-specific risk assessment model 528 is then used to identify the individual-specific risks and associated probabilities of injury 532. A home risk profile may also be generated. For example, a home risk profile, measured from 0-1 may indicate the following: living room, 8/10 risk (or 0.8); staircase, 10/10 risk (or 1).

Potential Danger Prediction

After the assessment, the user is presented with their home's risk profile. In addition, the user is presented with recommendations on how to correct the risk, and advised on when to next assess the safety of the home. At the time of the next assessment, the user will receive a notification with a risk map of the previous assessment and may setup a request to re-assess the home environment.

Safety-Proofing Recommendation

In addition to highlighting hazards in the current home environment, similar methods can be used to advise users on the safety of new furniture, a proposed new house arrangement, and the like. For example, a reduction of direct high intensity flickering light would need to be considered for an individual who has light sensitivity and devices for limiting loud sounds would need to be considered for individuals with hearing sensitivities. Elopement (wandering) in reaction to an interest, such as water, or as a result of being frightened (as would be expected when someone is suddenly disturbed by loud sounds), is a risk. Assessment of the adequacy of structures, such as gates, is therefore an important feature of the device. Part of the advisory capability of the device is to look into the future and provide recommendations on safety upgrades, including cost estimates for fully securing the home.

Figure 6:
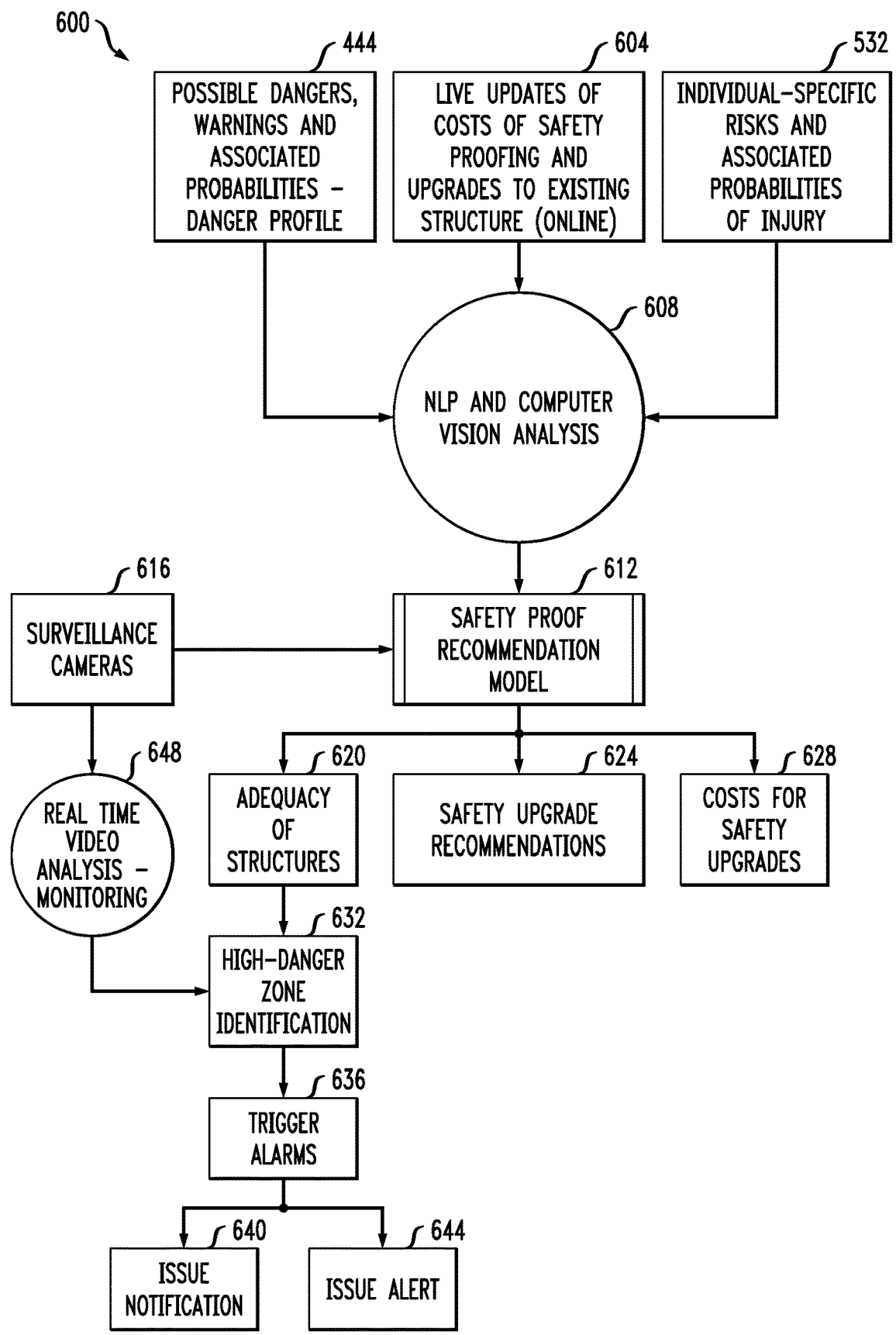
FIG. 6 is a workflow for training a safety-proof recommendation model and issuing safety alerts, in accordance with an example embodiment.

FIG. 6 is a workflow 600 for training a safety-proof recommendation model 612 and issuing safety alerts 644, in accordance with an example embodiment. In one example embodiment, natural language processing and computer vision analysis are performed on the warnings (with associated probabilities of injury) 444, the individual-specific risks and associated probabilities of injury 532, and live cost updates 604 (regarding the costs of safety proofing and upgrading existing structures) to train the safety proof recommendation model 612. The natural language processing and computer vision analysis extracts parameters, matches parameters to objects and structure, analyzes video and identifies objects, extracts image captioning, extracts and matches captions, extracts online costs, and performs matching to home input (operation 608—see also method 400, FIG. 4).

Based on the safety-proof recommendation model 612 and images obtained from cameras 616, safety upgrade recommendations 624 and cost estimates for the safety upgrades 628 are generated. In addition, the adequacy of the (safety) structures 620 is analyzed and reported.

During the monitoring phase, the images obtained by cameras 616 are subjected to real-time video analysis (operation 648) and the output of the video analysis together with the adequacy of the structures 620 are analyzed to generate a list of high-danger zones (operation 632). If an individual is observed approaching a high-danger zone, an alarm is triggered (operation 636), such as triggering an alarm on a caretaker's mobile phone or smart digital assistant. In one example embodiment, a caretaker is notified by an alarm to remove the child from danger (operation 640). In addition, an alert is issued to a user regarding the identified dangers, including recommended safety upgrades and associated costs (operation 644). According to some embodiments, the alert 644 can be issued to an internet of things (IoT) device causing the IoT to take an action. For example, the alert can cause actions including operating a lock on a door (lock/unlock), turning off a heat source, lowering the volume of music output by a sound system, issuing a pre-recorded verbal command via the smart digital assistant, etc. It should be understood that IoT devices are typically connected by wired and wireless communication technologies and that each IoT device has a unique identifier. In an embodiment in which the system communicates with an IoT device, the system also includes a unique IoT identifier.

Live Monitoring

In homes where cameras 616 are installed, the system processes the camera video feed in real-time. Based on the home assessment and previous global injury reports, the system would have already identified the high-danger zones in the home. As an individual approaches a zone of possible danger (such as towards a stove), the system triggers an alarm to alert the caretaker to remove the child from the potentially dangerous situation. The system, through the existing camera, has "an eye" on the child as long as they are in the areas of the home covered by the cameras 616. In addition, if there are any new changes to the home environment (such as new furniture, new placement of different objects, and the like), the system re-assesses the safety of the home. When new hazards are detected and the alarm is triggered, a notification is issued, for example, via a mobile device. In addition, the system includes a module that learns about the short-term patterns of an individual's movement over time by, for example, analyzing their behavior on camera, to predict the dangers to which they are most likely to be exposed (based on their personality). In one example embodiment, links between personalities and risks are obtained from accident reports (such as written reports 416).

Figure 7:
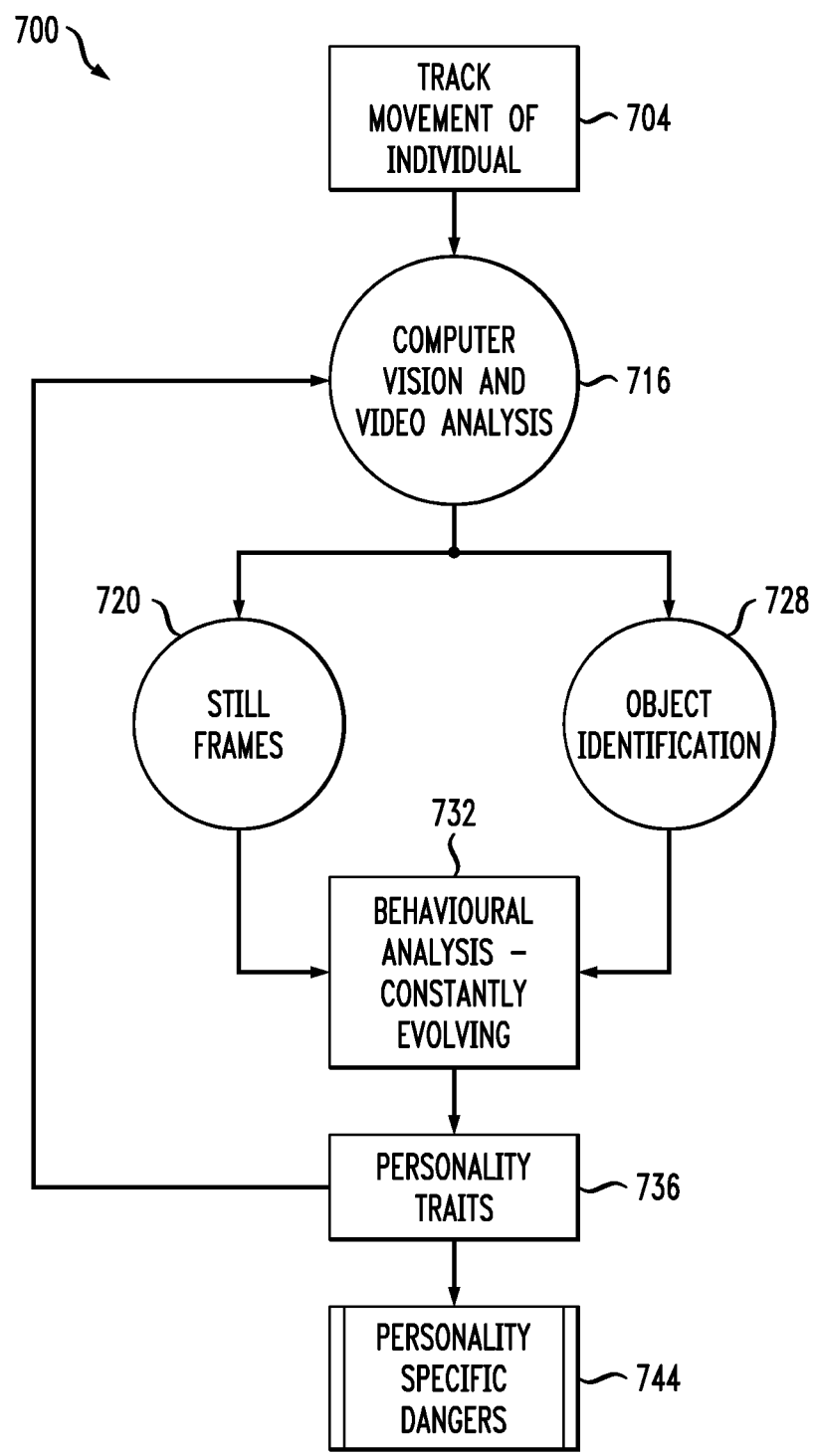
FIG. 7 is a workflow for performing behavioral analysis to predict individual-specific dangers based on monitoring, in accordance with an example embodiment.

FIG. 7 is a workflow 700 for performing behavioral analysis to predict individual-specific dangers based on monitoring, in accordance with an example embodiment. In one example embodiment, an individual's movement is tracked via cameras 616 (operation 704). Computer vision and video analysis are performed (operation 716) to generate still frames 720 and identify objects or situations in those still frames 728. In one example embodiment, an analysis is performed (operation 732) on the still frames 720 and the object identifications 728 to identify personality traits 736 (e.g., exhibit a behavior or habitual pattern of leaving a door ajar, storing medication on a countertop, etc.). Based on the personality traits 736, personality-specific dangers are identified (operation 744). These personality-specific dangers can be used to augment the individual-specific risks and associated probabilities of injury at blocks 532.

Summary of Interventions

Once-off and stage-based advice (advice corresponding to an individual's status) on how to safety-proof a home: identifying risk factors and giving recommendations to reduce the risk;

Continuous (live) monitoring of individuals and issuing of danger alerts;

On-going (evolving) notification of new risk factors: notifications/alarms based on how dangerous a situation is and the time it will take to prevent an incident; and Continuous home assessments and continuous (evolving) notifications of home risk factors.

Given the discussion thus far, it will be appreciated that, in general terms, an exemplary method, according to an aspect of the invention, includes the operations of performing computer vision and video analysis (operation 408) on one or more images and/or video 404 of the accessible environment to generate a series of still frames 412 for a database of training images 432; performing natural language processing (NLP) (operation 420) on one or more written reports 416 to generate textual parameters 424; performing an online image similarity search (operation 436) using the textual parameters 424 to generate additional images for the database of training images 432; generating a risk/danger prediction model 440 based on the database of training images 432; and identifying one or more potential dangers and generating one or more warnings 444 using the risk/danger prediction model 440.

In one example embodiment, at least one of the warnings 444 has an associated probability of injury. In one example embodiment, the one or more images and/or video 404 are captured based on a view of the accessible environment from a perspective of a specified individual. In one example embodiment, a height to position a camera is recommended and a depth sensor is used to measure a height of the camera from ground level. In one example embodiment, an inventory of objects in the accessible environment is captured by guiding a user through taking pictures of the accessible environment. In one example embodiment, one or more additional training images are generated using a generative adversarial network (GAN) or an autoencoder (operation 428). In one example embodiment, computer vision and video analysis (operation 452) are performed on home accident video 448 to generate a second series of still frames 456 for the database of training images 432; and natural language processing and computer vision analysis (operation 460) are performed on the second series of still frames 456 to identify one or more objects within the one or more training images 432 and to generate at least one caption for the training images 432. In one example embodiment, natural language processing (operation 464) is performed to extract captions, objects, and relative parameter associations to generate training text 468, and wherein the generation of the danger prediction model is based on the training text 468.

In one example embodiment, natural language processing and computer vision analysis (operation 516) are performed on individual specific details 508 and reported home injury accident data 512 to identify objects, image captioning, and extracted parameters; one or more training images and text 520, 524 are generated based on the identified objects, captioned images, and extracted parameters; an individual-specific risk assessment model 528 is generated based on the one or more training images and text 520, 524; and one or more individual specific risks 532 are identified using the individual-specific risk assessment model 528. In one example embodiment, natural language processing and computer vision analysis (operation 608) are performed on the one or more warnings 444, individual specific risks 532, and live cost updates 604 to train a safety proof recommendation model 612; an adequacy of one or more structures 620 is defined; video analysis (operation 648) is performed on one or more images obtained from one or more cameras 616; the adequacy of the structures 620 and results of the video analysis are analyzed to generate a list of high-danger zones 632; and an alarm (operation 636) is triggered in response to an individual being observed approaching a high-danger zone. In one example embodiment, one or more safety upgrade recommendations 624 and one or more cost estimates are generated for one or more safety upgrades 628 based on the safety proof recommendation model 612.

In one example embodiment, the natural language processing and computer vision analysis extracts parameters, parameters to objects and structures are matched, video is analyzed, and objects are identified, images are captioned, captions are extracted and matched, and online costs are extracted. In one example embodiment, a notification and an alert are issued to a user regarding the high-danger zone. In one example embodiment, movement of an individual is tracked via one or more cameras 616 (operation 704); computer vision and video analysis (operation 716) are performed to generate one or more still frames 720 and object identification 728; behavioral analysis (operation 732) is performed on the still frames 720 and the object identification 728 to identify one or more personality traits 736 of the individual; and the danger 744 is identified based on the one or more personality traits 736. In one example embodiment, an anomaly which could trigger an adverse response in the individual is detected.

In one aspect, a non-transitory computer readable medium comprises computer executable instructions which when executed by a computer cause the computer to perform the method of performing computer vision and video analysis (operation 408) on one or more images and/or video 404 of the accessible environment to generate a series of still frames 412 for a database of training images 432; performing natural language processing (NLP) (operation 420) on one or more written reports 416 to generate textual parameters 424; performing an online image similarity search (operation 436) using the textual parameters 424 to generate additional images for the database of training images 432; generating a risk/danger prediction model 440 based on the database of training images 432; and identifying one or more potential dangers and generating one or more warnings 444 using the risk/danger prediction model 440.

In one aspect, an apparatus comprises a memory, and at least one processor, coupled to said memory, and operative to perform operations comprising performing computer vision and video analysis (operation 408) on one or more images and/or video 404 of the accessible environment to generate a series of still frames 412 for a database of training images 432; performing natural language processing (NLP) (operation 420) on one or more written reports 416 to generate textual parameters 424; performing an online image similarity search (operation 436) using the textual parameters 424 to generate additional images for the database of training images 432; generating a risk/danger prediction model 440 based on the database of training images 432; and identifying one or more potential dangers and generating one or more warnings 444 using the risk/danger prediction model 440.

Figure 8:
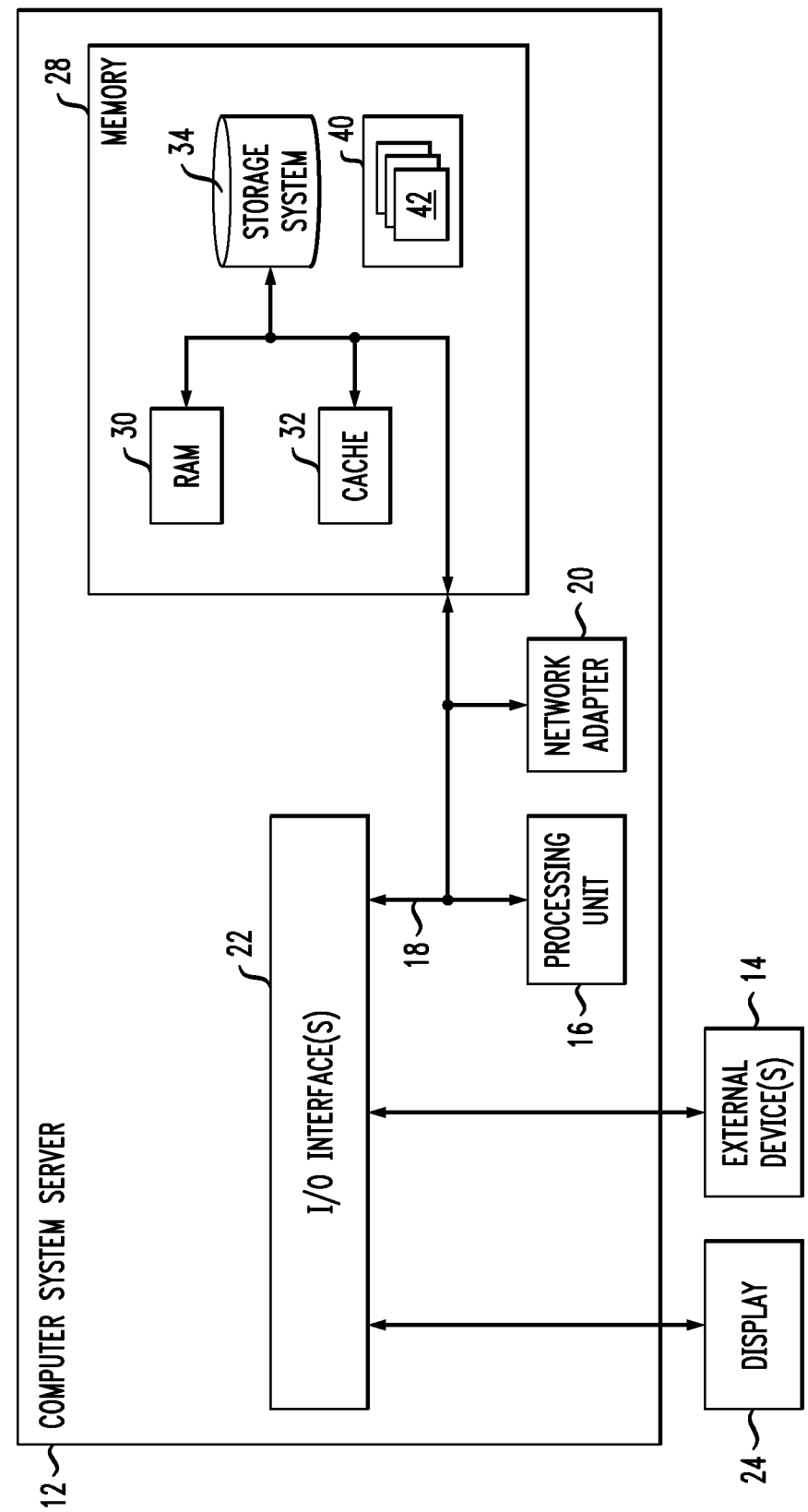
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to identify dangers in an accessible environment, the method comprising:
   performing computer vision and video analysis on one or more images and/or video of the accessible environment obtained from one or more cameras to generate a series of still frames for a database of training images;
   identifying objects and structures in the series of still frames;
   performing natural language processing (NLP) on one or more written reports to generate textual parameters and match the textual parameters to ones of the objects and the structures and caption respective ones of the still frames including the ones of the objects and the structures;
   performing an online image similarity search using the textual parameters to generate additional images for the database of training images;
   generating a risk/danger prediction model based on the database of training images;
   identifying one or more potential dangers and generating one or more warnings using the risk/danger prediction model;
   performing NLP and computer vision analysis on the one or more warnings to train a safety proof recommendation model;
   generating one or more safety upgrade recommendations and one or more cost estimates for one or more safety upgrades based on the safety proof recommendation model;
   assessing an adequacy of the structures and results of the video analysis to generate a list of high-danger zones in the accessible environment; and triggering an alarm is in response to an individual being observed in a real-time video analysis approaching a high-danger zone in the list of high-danger zones.

2. The method of claim 1, wherein at least one of the one or more warnings has an associated probability of injury.

3. The method of claim 1, further comprising capturing the one or more images and/or video based on a view of the accessible environment from a specified height from a ground level.

4. The method of claim 3, further comprising positioning a camera at the specified height using a depth sensor of the camera that measures a current height of the camera from the ground level.

5. The method of claim 1, further comprising capturing an inventory of the objects in the accessible environment by guiding a user through taking pictures of the accessible environment.

6. The method of claim 1, further comprising generating one or more additional training images using a generative adversarial network (GAN) or an autoencoder.

7. The method of claim 1, further comprising performing computer vision and video analysis on home accident video to generate a second series of still frames for the database of training images; and
performing natural language processing and computer vision analysis on the second series of still frames to identify one or more additional objects within the training images and to generate at least one caption for the training images including the one or more additional objects.

8. The method of claim 7, further comprising performing natural language processing to extract captions, objects, and relative parameter associations to generate training text, and wherein the generation of the risk/danger prediction model is based on the training text.

9. The method of claim 1, further comprising:
generating an individual-specific risk assessment model based on the one or more training images and the textual parameters; and
identifying one or more individual specific risks using the individual-specific risk assessment model.

10. The method of claim 1,
wherein the training of the safety proof recommendation model uses individual specific risks and live cost updates.

11. The method of claim 1, further comprising issuing a notification and an alert to a user regarding the high-danger zone.

12. The method of claim 1, further comprising:
tracking movement of an individual via one or more cameras;
performing computer vision and video analysis to generate one or more still frames and object identification;
performing behavioral analysis on the still frames and the object identification to identify one or more personality traits of the individual; and
identifying the one or more potential dangers based on the one or more personality traits.

13. The method of claim 12, further comprising detecting an anomaly which could trigger an adverse response in the individual.

14. A non-transitory computer readable medium comprising computer executable instructions which when executed by a computer cause the computer to perform a method of:
performing computer vision and video analysis on one or more images and/or video of an accessible environment obtained from one or more cameras to generate a series of still frames for a database of training images;
identifying objects and structures in the series of still frames;
performing natural language processing (NLP) on one or more written reports to generate textual parameters and match the textual parameters to ones of the objects and the structures and caption respective ones of the still frames including the ones of the objects and the structures;
performing an online image similarity search using the textual parameters to generate additional images for the database of training images;
generating a risk/danger prediction model based on the database of training images;
identifying one or more potential dangers and generating one or more warnings using the risk/danger prediction model;
performing NLP and computer vision analysis on the one or more warnings to train a safety proof recommendation model;
generating one or more safety upgrade recommendations and one or more cost estimates for one or more safety upgrades based on the safety proof recommendation model;
assessing an adequacy of the structures and results of the video analysis to generate a list of high-danger zones in the accessible environment; and
triggering an alarm is in response to an individual being observed in a real-time video analysis approaching a high-danger zone in the list of high-danger zones.

15. An apparatus comprising:
a memory; and
at least one processor, coupled to said memory, and operative to perform operations comprising:
performing computer vision and video analysis on one or more images and/or video of an accessible environment obtained from one or more cameras to generate a series of still frames for a database of training images;
identifying objects and structures in the series of still frames;
performing natural language processing (NLP) on one or more written reports to generate textual parameters and match the textual parameters to ones of the objects and the structures and caption respective ones of the still frames including the ones of the objects and the structures;
performing an online image similarity search using the textual parameters to generate additional images for the database of training images;
generating a risk/danger prediction model based on the database of training images;
identifying one or more potential dangers and generating one or more warnings using the risk/danger prediction model;
performing NLP and computer vision analysis on the one or more warnings to train a safety proof recommendation model;
generating one or more safety upgrade recommendations and one or more cost estimates for one or more safety upgrades based on the safety proof recommendation model;
assessing an adequacy of the structures and results of the video analysis to generate a list of high-danger zones in the accessible environment; and triggering an alarm is in response to an individual being observed in a real-time video analysis approaching a high-danger zone in the list of high-danger zones.

16. The apparatus of claim 15, the operations further comprising capturing the one or more images and/or video based on a view of the accessible environment from a perspective of a specified individual.

17. The apparatus of claim 15, the operations further comprising recommending a height to position a camera and using a depth sensor to measure a height of the camera from ground level.

18. The apparatus of claim 15, the operations further comprising performing computer vision and video analysis on home accident video to generate a second series of still frames for the database of training images; and performing natural language processing and computer vision analysis on the second series of still frames to identify one or more additional objects within the training images and to generate at least one caption for the training images including the one or more additional objects.

* * * * *